US009102139B2

(12) United States Patent
Soto et al.

(10) Patent No.: US 9,102,139 B2
(45) Date of Patent: Aug. 11, 2015

(54) INDUSTRIAL INKJET PRINTER WITH DIGITAL COMMUNICATIONS SUPPLY CABLING

(75) Inventors: Patrick Soto, Saint Marcel les Valence (FR); Max Brousse, Saint Marcel les Valence (FR)

(73) Assignee: MARKEM-IMAJE, Bourg-les-Valence (FR)

(*) Notice: Subject to any disclaimer, the term of this patent is extended or adjusted under 35 U.S.C. 154(b) by 21 days.

(21) Appl. No.: 13/578,396

(22) PCT Filed: Jan. 25, 2011

(86) PCT No.: PCT/EP2011/050931

§ 371 (c)(1), (2), (4) Date: Nov. 12, 2012

(87) PCT Pub. No.: WO2011/098345

PCT Pub. Date: Aug. 18, 2011

(65) Prior Publication Data

US 2013/0057904 A1 Mar. 7, 2013

Related U.S. Application Data

(60) Provisional application No. 61/282,662, filed on Mar. 15, 2010.

(30) Foreign Application Priority Data

Feb. 11, 2010 (FR) ..................................... 10 50973

(51) Int. Cl.
*G06F 3/12* (2006.01)
*B41J 29/38* (2006.01)
(Continued)

(52) U.S. Cl.
CPC .............. *B41J 2/03* (2013.01); *B41J 2002/022* (2013.01)

(58) Field of Classification Search
CPC ...... B41J 2/175; B41J 2/04506; B41J 2/0451; B41J 2/04528; B41J 2/04543; B41J 2/04563; B41J 2/04573; B41J 2/04581; B41J 2002/16502; B41J 2002/17521; B41J 2002/14362; B41J 2/02; B41J 2/165; B41J 2/17; B41J 2/17593; B41J 2/18; B41J 2/12; B41J 2/15; B41J 2/1714; B41J 2/1721; B41J 2/185; B41J 2/325; B41J 2/355; B41J 2202/17
USPC ........ 358/1.15, 1.13; 347/5, 50, 85, 9, 20, 40, 347/47, 75, 76, 77, 7, 29, 49, 89, 94; 174/107
See application file for complete search history.

(56) References Cited

U.S. PATENT DOCUMENTS 5,160,939 A 11/1992 Bajeux et al.
5,455,606 A 10/1995 Keeling et al.
(Continued)

FOREIGN PATENT DOCUMENTS

EP 2 082 883 A2 7/2009
FR 2 636 884 A1 3/1990
(Continued)

OTHER PUBLICATIONS

Response to Written Opinion received by the EPO on Nov. 9, 2011.
(Continued)

*Primary Examiner* — Benny Q Tieu
*Assistant Examiner* — Juan M Guillermety
(74) *Attorney, Agent, or Firm* — Miles & Stockbridge P.C.

(57) ABSTRACT

A supply cable of a printing head of a continuous inkjet printer, including means for supplying fluids to the head, means forming a bidirectional digital serial link in order to transmit digital data between the head and the means for driving the printer, and low voltage power supply means, as well as a circuit for a printing head of a continuous jet printer and a method for transmitting data to the printing head.

23 Claims, 8 Drawing Sheets

(51) Int. Cl.

| | |
|---|---|
| ***B41J 2/03*** | (2006.01) |
| *B41J 2/02* | (2006.01) |

(56) References Cited

U.S. PATENT DOCUMENTS

| | | | | |
|---|---|---|---|---|
| 5,920,332 | A | 7/1999 | Brooks | |
| 5,992,991 | A | 11/1999 | Kanemoto et al. | |
| 6,357,860 | B1 | 3/2002 | Rhodes | |
| 6,371,668 | B1 * | 4/2002 | Sugiyama et al. | 400/61 |
| 6,467,880 | B2 | 10/2002 | Rhodes | |
| 6,476,928 | B1 * | 11/2002 | Barbour et al. | 358/1.15 |
| 2001/0001244 | A1 | 5/2001 | Rhodes | |
| 2002/0005874 | A1 * | 1/2002 | Imai et al. | 347/33 |
| 2002/0054311 | A1 * | 5/2002 | Kubo | 358/1.13 |
| 2005/0110836 | A1 * | 5/2005 | Colombat et al. | 347/85 |
| 2005/0248604 | A1 * | 11/2005 | Schremp | 347/19 |
| 2009/0189960 | A1 | 7/2009 | Matsuda et al. | |
| 2010/0207976 | A1 * | 8/2010 | Omer et al. | 347/9 |
| 2010/0238209 | A1 * | 9/2010 | Omer et al. | 347/9 |
| 2010/0259588 | A1 * | 10/2010 | Stamp | 347/85 |
| 2011/0141168 | A1 * | 6/2011 | Wayman | 347/7 |
| 2011/0209895 | A1 * | 9/2011 | Saito et al. | 174/107 |

FOREIGN PATENT DOCUMENTS

| | | | | |
|---|---|---|---|---|
| GB | 2 435 447 | A | 8/2007 | |
| GB | 0719992 | * | 10/2007 | B41J 2/02 |
| GB | 2 447 919 | A | 10/2008 | |
| JP | 3-500749 | | 2/1991 | |
| JP | 2000-229419 | | 8/2000 | |
| JP | 2001-071532 | | 3/2001 | |
| JP | 2005-520717 | | 7/2005 | |
| JP | 2007-190727 | | 8/2007 | |
| JP | 2009-286112 | | 12/2009 | |
| WO | WO 89/03768 | | 5/1989 | |
| WO | WO 2009/098494 | A2 | 8/2009 | |

OTHER PUBLICATIONS

Markem-Imaje Model 9020 Product Description uploaded to the World Wide Web on Feb. 24, 2010 and available at http://www.slideshare.net/Simt/markem-imaje-9020-inkjet-printer.

Observations pursuant to Article 115 EPC filed in European Patent Application No. 11700944.9 and dated Dec. 2, 2013.

Office Action issued May 13, 2014, in Chinese Application No. 201180018581.6 with English Translation.

Office Action issued Sep. 30, 2014, in Japanese Application No. 2012-552332 with English Translation.

Office Action issued Jan. 15, 2015, in Chinese Patent Application No. 201180018581.6 with English Translation.

* cited by examiner

INDUSTRIAL INKJET PRINTER WITH DIGITAL COMMUNICATIONS SUPPLY CABLING

TECHNICAL FIELD AND PRIOR ART

The invention relates to the link between the console of an industrial continuous inkjet printer and the printing head intended to project ink drops on a medium. The link according to the invention allows a novel distribution of electronic functions leading to an increase in the performances and to a reduction in the cost of the printer.

Industrial continuous inkjet printers are known in the field of coding and industrial marking of various products, for example for marking barcodes or the date of expiry on food products, directly on the production line and at a high rate.

This type of printer is also found in certain fields of decoration where graphic printing possibilities of the technology are utilized.

Two categories are distinguished among continuous inkjet printers:

- on the one hand, multi-deflected continuous jet printers wherein each drop of a single jet (or of a few jets) may be sent on various trajectories corresponding to different deflection commands for each drop, thereby achieving scanning of the area to be printed following a direction which is the deflection direction;
- on the other hand, binary continuous jet printers wherein a plurality of jets placed side by side each only have one trajectory intended for printing; by synchronously controlling at a given time all the jets, it is possible to print on the medium a pattern generally reproducing that of the distribution of the nozzles on the nozzle plate.

In both cases, the other direction for scanning the area to be printed is covered by a relative displacement of the printing head and of the medium to be printed.

These printers have several typical sub-assemblies, which are found in most industrial continuous inkjet printers available on the market (Markem-Imaje, Videojet, Domino or further Linx and Hitachi). Indeed, these machines as they are used on production lines, are generally equipped with a printing head of small size which allows them to be integrated in reduced spaces.

As illustrated in FIG. 1 (case of a multi-deflected continuous inkjet printer), this head 1 is remotely deployed, generally by several meters, with respect to the body of the printer 20, also called console, in which the hydraulic and electric functions required for operating and controlling the head are elaborated.

The console therefore contains an ink circuit 100 and a controller 110 connected to the head through an umbilical 15.

The printing head 1 includes a set of means for generating and controlling the jet, i.e. a drop generator 2, a charging electrode 7, a device for detecting drops 8, a set of deflection plates 4, and a gutter 3 for recovering the drops.

From the drop generator 2, electrically conducting pressurized ink, conveyed from the ink circuit 100, is issued through at least one calibrated nozzle 5, thereby forming at least one ink jet 9.

Under the action of a periodic stimulation device (not shown) controlled by a signal from the controller, the ink jet is broken at regular time intervals, corresponding to the period of the stimulation signal, in a specific location of the jet downstream from the nozzle.

This forced fragmentation of the inkjet is usually induced in a so-called "breaking" point 6 of the jet. The most often used stimulation device is a piezoelectric ceramic placed in the ink upstream from the nozzle.

At the so-called "breaking point" of the jet, the continuous jet is transformed into a sequence 9 of identical and regularly spaced out ink drops. This drop sequence makes it way following a trajectory corresponding to the ejection axis of the drops, which substantially reaches by the geometrical design of the printing head, the centre of the recovery gutter 3.

The charging electrode 7, individual for each jet, is located in the vicinity of the breaking point of the jet. It is intended to selectively charge each of the formed drops to a predetermined electric charge value. To do this, as the ink is maintained at a set electric potential in the drop generator, a determined voltage is applied to the charging electrode 7, different for each drop.

An amount of electric charges depending on the voltage level of the electrode 7, is generated on the jet upstream from the breaking point of the jet by an electrostatic influence and is picked up by the drop at the moment when it breaks away from the jet. The charging voltage to be applied is generated by the controller 110 and conveyed towards the head 1. It may be noted that this charging control is individual for each jet present in the multi-deflected continuous ink jet head. Indeed, the charging sequences and the time course of the signal are different for each jet.

The charging signal is synchronized with the stimulation signal, but with a phase lag specific to each jet as determined with the device described below.

A device for detecting drops 8 is positioned downstream from the charging electrode 7, providing the controller 110 with a signal which allows it to measure the electric charge actually loaded on the drops as well as the velocity of these drops in the head. This device 8 senses the current induced by a capacitive effect when the specifically charged drops pass close to the sensitive surface of one or more electrostatic sensor(s). An example of this type of device is described in patent FR 2 636 884 of Markem-Imaje or in the Linx U.S. Pat. No. 6,467,880.

This signal is conveyed up to the controller, with suitable shielding means, in order not to be added with noise from very energetic signals, for example charging signals.

Downstream from the charging electrode, deflection plates 4 are placed on either side of the trajectory of the drops. Both of these plates are brought to a fixed relative electric potential of several thousand volts, producing an electric field Ed substantially perpendicular to the trajectory of the drops. This potential difference is generated at the console 110 and is transmitted to the head with suitable electric insulation.

This electric field Ed is therefore capable of deflecting the electrically charged drops which enter between the plates 4. The amplitude of the deflection depends on the charge and on the velocity of these drops. These deflected trajectories 10 escape from the gutter 3 in order to impact on the medium to be printed 11.

The placement of the drops, inside the impact matrix of drops to be printed on this medium 11, is obtained by combining the individual deflection given to the drops of the jet and the relative displacement between the head and the medium 11 to be printed.

The gutter 3 for recovering the non-printed drops captures the unused ink in order to return it towards the ink circuit 100 so as to be recycled. The non-printed drops are those which have not been charged or for which the charge is too small for having their deflection lead them out of the gutter.

The operation of the gutter and the stability of the orientation of the non-deflected jet contribute to the operation robustness of the printer. This is why a sensor is usually found at the gutter, the signal of the sensor allowing the controller to analyze the ink flow captured in the gutter. In the printers (for example Imaje Series 9020) of the prior art, the sensor observes the resistive behavior of the ink flow entering the gutter.

The principle of this measurement consists of injecting a known electric current into a resistance formed by the liquid stream and picking up the resulting voltage. This voltage is conveyed towards the controller 110 with suitable shielding since the signal may be added with electrical noise.

Such a device further includes hydraulic switching, fluid distribution or protective components. Some of these components are passive such as valves, conduits or filters. Others are active, such as solenoid valves 410, and require electric control elaborated at the controller 110 and transmitted by the umbilical 15 up to the head 1.

Finally, it implements simple electronic or electric functions such as:

- preamplifiers for the weak signals generated at the head (for example for detecting drops) which require an electric power supply in order to operate,
- stroboscopic lighting synchronized on the stimulation signal, with which the periodic breaking of the jet may be observed,
- and, in certain cases, a component for heating the head or on/off contacts (safety mechanisms for opening the lid, head type coding, . . . ).

All these functions are connected to the controller 110 through conductors which themselves also pass through the umbilical cable 15.

A printer console 20 mainly contains the ink circuit 100, the controller 110 for controlling the printer and a user interface 120 allowing interaction with the printer.

The ink circuit 100 mainly implements the following functions:

- providing pressurized ink of adequate quality to the drop generator of the head 1,
- recovering and recycling the fluids not used for printing returning from the gutter of the head 1,
- suction for purging the drop generator located in the head 1,
- providing solvent to the head 1 for rinsing carried out during head maintenance operations.

It is also possible to add to the functions above, the provision of pressurized air for pressurizing the head, useful for protecting the head from external pollution.

These 5 functions are each associated with a conduit connecting the ink circuit 100 and the head 1.

The controller 110 generally consists of one or more electronic cards and of on-board software packages which ensure the driving of the ink circuit 100 and of the printing head 1.

As regards the driving of the head, the solutions of the prior art require the implementation on the card of the controller 110 of the different electronic analog and logic functions with which the members of the head may be activated through the umbilical 15. In the controller 110, are notably found:

- an amplifier of the piezoelectric signal for stimulating the jet (a periodic signal of about hundred volts peak-to-peak),
- a charging amplifier (an energizing charging signal, which may attain 300 volts),
- electronics for detecting the charge of drops on the fly allowing amplification and processing of the phase detection signal in order to infer therefrom proper synchronization of the charging and the velocity of the jet,
- gutter detection electronics which generates a signal for energizing the gutter sensor and processes the response signal in order to characterize the operation of the ink recovery in the gutter,
- solenoid valve control drivers,
- a driver for driving the stroboscopic LED for observing the breaking,
- a VHV power supply unit for the deflection plates 4, generating a voltage of several thousand volts from low voltage power supplies,
- electric power supplies for the stimulation amplifier (100V) and the charging amplifier (350V), made from low voltage power supplies,
- other functions: lid contact, heating.

The umbilical 15 connects the console 20 to the printing head 1 and contains the hydraulic and electric connections mentioned above.

FIG. 2 shows a section of an umbilical cable 15 of the prior art connecting the console of a printer of the 9040 type from Markem-Imaje to a head including up to 2 jets.

In this umbilical cable are again found:

- the 5 hydraulic conduits mentioned earlier: the recovery pipe 210 with a large diameter at the centre, the ink pipe 211 and the purge pipe 212, both of medium diameter, the solvent pipe 213 of small diameter, and the air pressurization pipe 214,
- the coaxial cable 220 for the stimulation signal, with a large section, which conveys an energizing signal of the order of 100 volts peak-to-peak, should have efficient shielding for limiting cross-talk with the other signals conveyed by the umbilical,
- the charging wires 230 (one per jet), which convey strong amplitude signals (up to 300 Volts) and with very steep rising edges. These wires have a large diameter in order to meet the need for sufficient insulation and for a capacitive load as small as possible,
- the drop detection and gutter coaxial cables 221, 222 (one of each per jet), which convey delicate signals from the head 1 to the controller 110 and require adequate shielding, which leads to a consequent diameter,
- the wires 231, which supply a very high voltage VHV (+/−4000 Volts) to the deflection plates. Their insulation should be very thick and their capacitance accumulates energy which should be taken into account in designing the head in order to avoid dangerous discharges in the case of a short-circuit of the plates,
- the ground wire 232 of large diameter, which ensures proper equipotentiality between the different sub-assemblies of the machine.

Other single wires 240 of relatively small diameter, are present: a wire for setting the ink to 0 Volt, 3 electric power supply wires for conveying 2 voltages (+/−15 Volts), 2 wires for driving the stroboscopic LED, 4 wires for controlling the solenoid valves of the head 1, 2 contact wires of the lid and 2 wires for anti-condensation heating.

The results are 24 wires and coaxial cables (to which a troubleshooting wire is added) including 10 of them which have a substantial diameter.

The umbilical described above is integrated, i.e. the conduits and conductors are laid out in a compact way, and are wrapped in a shielding braid 201, the whole being overmoulded in an outer cladding 202. This technology should be opposed to that of umbilicals of the “anaconda” type in which the conduits and conductors are inserted in an independent ringed cladding which is used as a sheath.

The umbilical of the prior art described above is relatively compact with a diameter of 15 mm, but its dimensions, its weight and its stiffness are a nuisance for integrating the printing head into a production or packaging line. It may be considered as one of those having the smallest diameter among the main suppliers of continuous inkjet printers: for example the Linx 4900 has an integrated umbilical with a diameter larger than 16 mm, as well as the machines Domino A200 or A300, Videojet Excel or Hitachi PX, which have umbilicals of the "anaconda" type, with a diameter larger than 20 mm.

However, this umbilical remains complex:

- the number of electric wires which pass in the umbilical is significant (more than about twenty wires for a head with one jet),
- the number of wires in the umbilical increases with the number of jets to be driven in the head (3 per additional jet),
- among the numerous electric wires of the umbilical, about ⅓ are technical wires, and therefore costly (in the above example: 3 coaxial wires—2 VHV conducting wires with strong insulation—1 large diameter—14 wires of small diameter and 3 extra technical wires per additional jet),
- the assembly at the printing head is complex because of the connection of numerous wires in an exiguous space, costly in equipment (if the assembling is achieved with complex connectors) and/or in operating time (if achieved by welding, or crimping),
- the signal transmission quality requires the use of a significant amount of noble and costly materials (copper, gold).

This umbilical is moreover difficult to integrate onto a production line:

- the diameter and weight thereof are significant. The diameters measured on the machines from the prior art are comprised between 16 mm and 22 mm (Imaje 9020: 16 mm, Domino A200/A300: 22 mm, Videojet EXCEL: 21.7 mm, Lynx 4900: 16.5 mm). With the diameter of the umbilical, it is also that of the ground braid of the outer shielding of the umbilical which increases with a significant effect on the weight and the cost of the umbilical: the surface area of the ground braid of the outer shielding of the umbilical, also an expensive component, increases with the perimeter of the cable,
- the stiffness and the minimum static radius of curvature are significant and increase the required space for integrating the head. Most of the time, the umbilical is mounted in the extension of the head, which requires significant space in addition to that of the head during the integration onto a production line.

A problem of limitation of the length of the umbilical, related to the performances of the electronics installed on the card of the controller 110 is also posed since the capacitive load increases with the length of the umbilical 15. This capacitive load influences the rapidity of the timing edges of the signals and of the current required in transient signals.

This type of embodiment of the prior art further requires over-dimensioning of the analog electronics located on the circuit board of the controller 110.

These electronics are actually dimensioned for handling the capacitive load of the umbilical 15 which is the major portion of the total capacitive load (umbilical+head).

The implemented electronic components are therefore expensive and bulky and their power has to be adapted.

Further, the overall cost should be considered with the effects induced on the electronic card surface, and heat dissipation.

The result is high electric consumption, generation of calories which have to be evacuated, and significant circuit board surface area for implementing the electronics.

Finally, the major portion of the power of the VHV block is used for powering the capacitive load of the umbilical during transient signals.

The problem of finding a new architecture is therefore posed, for a device of the continuous jet printer type.

The problem is also posed of finding a new connection cable structure with which the components of the architecture of a device of the continuous jet printer type may be connected together.

The problem is also posed of finding a new printing head structure of a device of the continuous jet printer type.

The problem is also posed of finding a new method for transferring data, between a printing head and its remote control means in a device of the continuous jet printer type.

DISCUSSION OF THE INVENTION

First of all a power supply cable for a printing head of a continuous inkjet printer is disclosed, including:

- means for supplying fluids to the head,
- means forming a bidirectional digital serial link for transmitting digital data between the head and the means for driving the printer,
- low voltage power supply means.

The means forming a bidirectional digital serial link may include a wire serial line, or an optical fiber, or means for having a carrier current flow on the power supply lines or any conducting medium, for example the ink, connecting the console to the printing head.

This power supply cable only conveying low voltages (below a few tens of Volts, for example less than 20 V or 10 V, further for example voltages of 5 and/or 15 V), there is no risk of triggering a fault which would be related to the simultaneous presence in the cable, of fluids supplying the printing head on the one hand, and of high voltage on the other hand.

Means forming a shielding of the cable may be provided.

Further, such a power supply cable may include means ensuring equipotentiality between the head and the means for driving the printer.

Very advantageously, such a power supply cable as disclosed above, has an outer diameter of less than 14 mm.

It is also disclosed an electronic device for controlling a printing head of a continuous inkjet printer, notably including means for forming drops, means for charging drops and means for deflecting drops, and also including digital means forming an electronic control circuit:

- for receiving digital data received from remote driving means, and for sending digital data to these driving means,
- for converting a portion of the received digital data into signals, some of which may be analog signals, for controlling means for forming drops, means for charging drops and means for deflecting drops,
- for controlling means for generating at least one high voltage from low voltage signals from the driving means.

The means forming an electronic control circuit, may further receive digital data from at least one sensor for sensing the charge of the drops and/or from a gutter sensor for recovery of the drops and/or digital data from at least one temperature sensor located in the printing head. One or more of these sensors may be of the analog type, the digital data resulting from the digitization of analog signals provided by the corresponding sensor(s).

The means forming an electronic control circuit receive digital data from the driving means, and then send digital data to these driving means at a data exchange frequency, for example a multiple of the drop formation frequency.

A continuous inkjet printer is further disclosed, including:

driving means, a printing head, including an electronic control device, as described above, a power supply cable for the printing head, as described above.

It may further include means forming an ink circuit.

A method for controlling a printing head of a continuous inkjet printer with driving means includes:

the sending by the driving means, and the receiving, by the printing head, of at least digital data for controlling drop formation means, drop charging means and drop deflection means, and low voltage power supplies, the sending by the printing head, and the receiving, by the driving means, of at least digital data from at least one sensor for sensing the charge of the drops and from a gutter sensor for recovering the drops.

The sending and receiving of data are preferably achieved through a bidirectional digital serial link.

A system or a method, or a communications cable between the console of a continuous inkjet printer and its printing head is proposed, which allows a very substantial reduction of the number of wires in the umbilical and therefore of its diameter and of its stiffness; with this, the integration of the head into production lines may notably be facilitated.

Furthermore a system, or a method, or a communications cable are also disclosed, between the console of a continuous inkjet printer and its printing head, with which it is possible to ensure transmission of data useful for operating the printing head and of time signals for synchronized activation of different functions of the head, over a single synchronous bidirectional digital serial line.

This line may be implemented by various linking technologies such as for example a wire link, or an optical fiber link, or a link by a carrier current over electric power supply wires or any other conducting medium connecting the console to the printing head.

In a preferred embodiment, all the data circulating between the console and the printer head are digitized. There is therefore no analog signal passing through the umbilical.

Only a low voltage electric power supply is conveyed towards the head (but it is not considered as a signal). In an alternative, the power supply lines may support digital signals through a carrier current, which reduces the number of required wires in the umbilical. In this configuration, all the analog electronics for driving the head is installed in the latter and is controlled by the digital circuit for controlling the printing head.

SHORT DESCRIPTION OF THE FIGURES

DETAILED DESCRIPTION OF PREFERRED EMBODIMENTS

Figure 3:
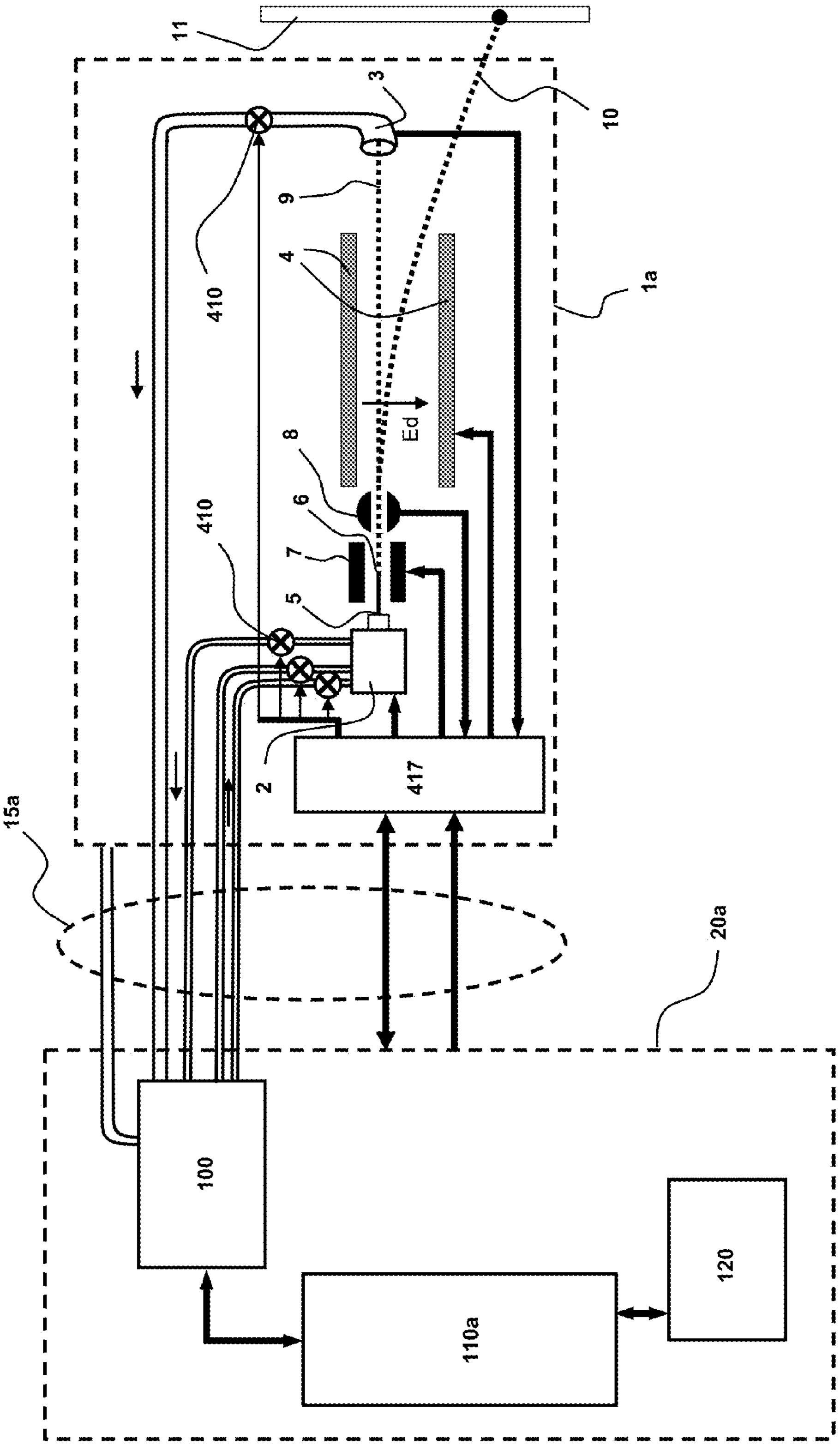
FIG. 3 is a diagram of a printer.

An exemplary printing device structure is illustrated in FIG. 3. Certain numerical references are identical with those of FIG. 1 and they then designate components which are not particularly modified with respect to this FIG. 1 and which operate as already described above.

Figure 1:
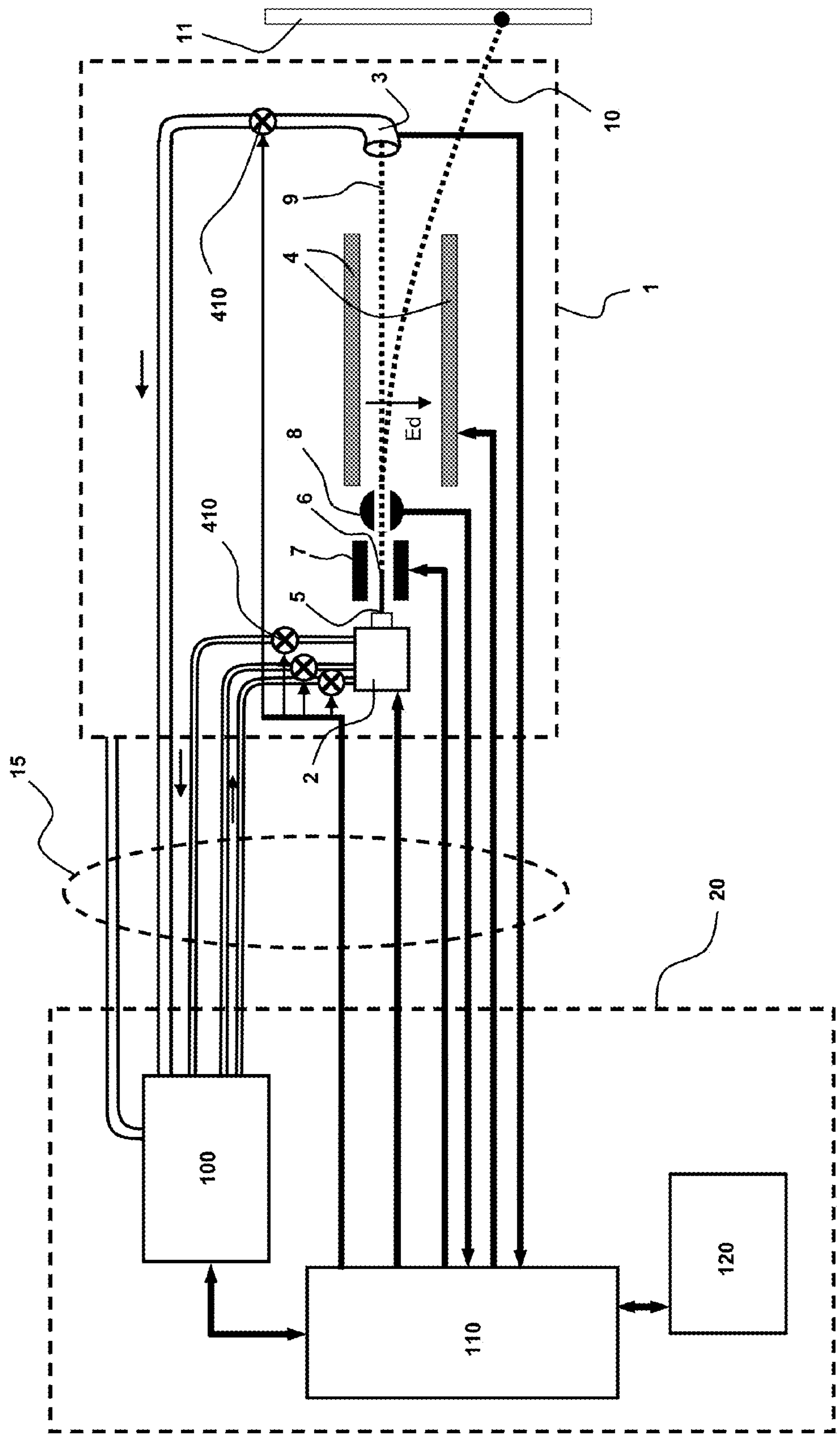
FIG. 1 is a diagram of a printer of the prior art.
Figure 2:
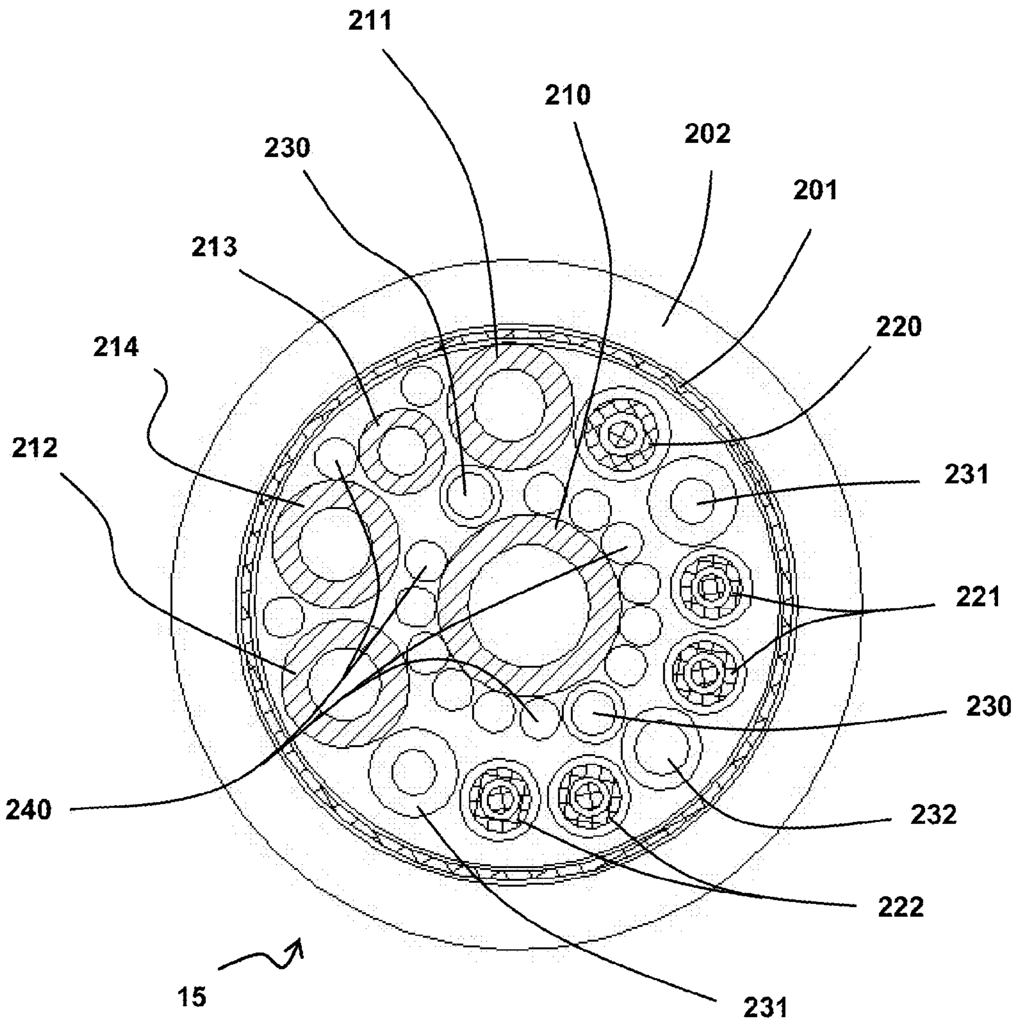
FIG. 2 is a sectional view of an umbilical of the prior art.

Other numerical references of FIG. 3 are modified with respect to those of FIG. 1, by the letter "a". They then designate components which are modified relatively to the structure described above in connection with FIG. 1.

The presence of electronic means or a digital circuit 410 is also noted in this FIG. 3, which will allow processing of the data from the console 20*a*, and which will also allow transmission to the latter of data from the printing head 1*a*, and notably digital data resulting from the digitization of analog signals measured by sensors of the head.

The latter therefore contains means 2, 5 for forming drops, means 7 for charging drops and deflection means 4 for directing the drops towards a surface 11 to be printed. More specifically, it includes a drop generator 2 and a nozzle 5 with which an inkjet 9 may be produced. At the point 6 of break up in the jet, the latter is transformed into a sequence 9 of identical and regularly spaced-out ink drops. Charging electrodes 7 are located in the vicinity of the point of the breakup in the jet. A device 8 for detecting drops is positioned downstream from the charging electrodes 7, and the drop sequence is then deflected by the deflection plates 4 placed on either side of the trajectory of the drops. The non-deflected drops are recovered by the gutter 3, while the deflected drops 10 will form an impact on the surface of the medium 11 to be printed. More detailed explanations on the operation of the various means 2-8 are given in the introduction to the present application and are part of the present description. The whole of these means are driven or controlled by electronic means 417.

In FIG. 3, the console 20*a* contains an ink circuit 100 and a controller 110*a* for driving the printer connected to the head 1*a* through an umbilical 15*a*.

A user interface 120 allows interaction with the printer.

The ink circuit 100 essentially includes the means already described above in connection with FIG. 1, in order to ensure the same functions of providing the ink, of recovering and recycling the non-used fluids, of suction for purging the drop generator 2, of providing solvent to the head for rinsing, and optionally providing pressurized air for pressurizing the head 1*a*. There again, reference may be made to the explanations already given above.

A method for transmitting the data is now described, between the printing head 1*a* and the control means 110*a*.

The transmission of the data is preferably applied by a digital serial link. Practically, the corresponding wires are positioned in the umbilical 15*a* which connects the means 110*a* and the head 1*a*. The umbilical will be described in detail later on.

The serial link may be implemented by means of a wire serial line or by an optical fiber, or by a carrier current on the power supply lines or on any conducting medium connecting the console to the printing head (shielding, or ground wires or conducting ink from the pressurized conduit). A use of the carrier currents is then to inject, as a superposition on the signals or power supply voltages present on a wire, a low amplitude signal with a very different frequency from the signals already present for conveying digital data which will then be easily extracted from the base signal by filtering.

Thus, the same conductor may be used for transporting several types of signals, for example a power supply voltage and a digital signal without any functional perturbation of either one of them. But, preferably, a synchronous differential wire link is applied, using two twisted pairs conveying the data and clock signals, which provides good immunity against electromagnetic noise (common mode noise being suppressed). The transmission of data is then synchronous with a clock.

A bidirectional digital serial link further allows controls, and circulation of data and time information between the console 110*a* and the head 1*a*, in order to ensure printing and control of the latter.

The link between the console and the head of the continuous inkjet printer does not include any analog signal, except for the low voltage electric power supply of the head by the console 110*a* (which is not considered as a signal).

With a method or a procedure for transmitting data or signals according to the invention, it is notably possible to encode and reconstruct a stimulation signal, which allows generation of the piezoelectric excitation signal, the characteristics of which are, in particular frequency, adapted to the operating point of the driven head.

This operating point links the diameter of the nozzle for projecting the drops, the frequency of projection of the drops 9 and the velocity of the jet. It may be adapted depending on the needs of the user in terms of resolution and printing rate for example, the frequency of the stimulation signal may therefore vary for a same communications system.

With a transmission method as disclosed, the generation and application of charging voltages to the charging electrodes 7 may further be synchronized with the generation of each drop.

Figures 4A, 4B, 4C:
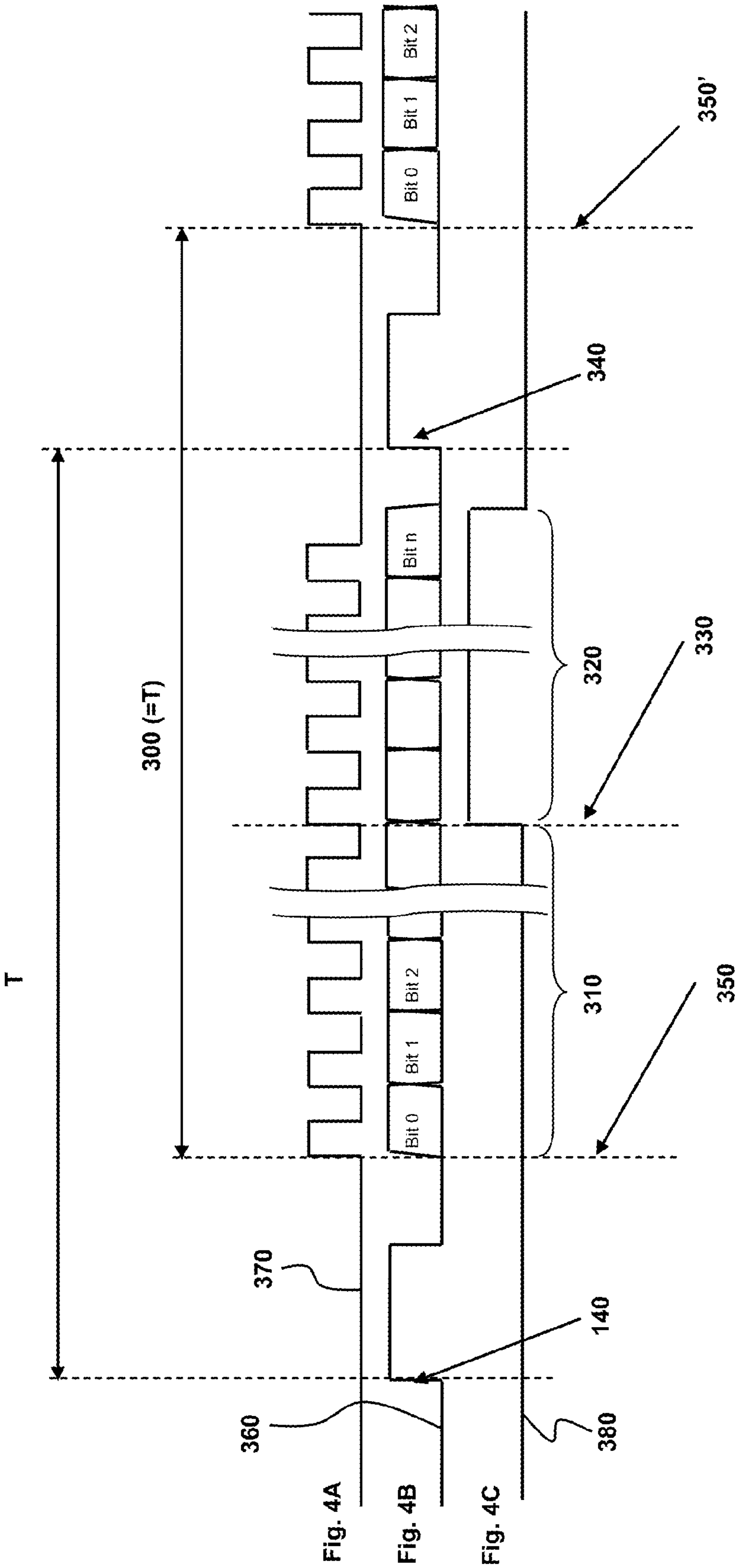
FIGS. 4A-4C illustrate a procedure and the time course of the events in the communications line of a device.

An exemplary transmission procedure is illustrated in FIGS. 4A-4C, wherein T designates the piezoelectric period. More specifically:

- FIG. 4A illustrates the clock signal 370 of the system,
- FIG. 4B illustrates the digital signals relating to the data of the system on the one hand:
  - the data (further called upstream data) transmitted during a first portion 310 of the transmission cycle, from the means 110*a* to the head 1*a*, and notably the state of charge of a drop, and/or the state of the solenoid valves, and/or of the LEDs,
  - the data (further called downstream data) transmitted during a second portion 320 of the transmission cycle, from the head 1*a* towards the means 110*a*.

The references 140 and 340 designate in this FIG. 4B synchronization signals.

- FIG. 4C is a graph illustrating the inversion of the data transmission direction, with notably a reversal 330 of this direction in the middle of the piezoelectric period.

As this was seen earlier, the head 1*a* is supplied with data from the controller 110*a* (in particular charging voltages) and, in return, provides the latter with the data which it generates.

Therefore a distinction is made between upstream data from the console 110*a* towards the head 1*a*, and downstream digital data which are sent from the head 1*a* towards the console 110*a*.

Preferably, a procedure applies a data exchange cycle with a duration equal to that of a drop period T, 300, (this is the case of FIG. 4) or an integer fraction of the period T (therefore T/n, with n being an integer >1).

The sequencing of the data exchange cycles is then accomplished at a frequency, a so-called "drop frequency" or at a integer multiple of this frequency. During a portion 310 of the cycle, the data line 360 transmits the upstream data as a synchronous train of bits with the clock signal 370 of the line (FIG. 4A); these data will be used by the head 1*a* during the following "drop period".

When the transmission of the upstream data is completed (at the instant designated by reference 330), the communications direction is reversed and a second portion 320 of the cycle relates to the transfer, in the other direction, of downstream data, also as a binary train. The transfer direction is represented by the high or low state of the signal 380 (FIG. 4C).

Before being reinitiated for the next drop period (which begins at 350, 350', . . . ), the cycle ends with a signal 340 transmitted over the data line 360, allowing resynchronization of the communication on both sides of the line, i.e. on the side of the circuit of the head and on the side of the circuit of the controller.

In practice, the transmission frequency of the data over this bidirectional line is a multiple of the drop frequency (which, as this has been seen, may be adapted depending on the head type). In a particular embodiment, the transmission of the bits is achieved at 200 times the drop frequency, i.e. 100 upstream bits and 100 downstream bits at each drop period. But more generally a transmission of bits may be used at N times the drop frequency, with N/2 upstream bits and N/2 downstream bits. On the other hand, the number of bits available in the upward or downward direction may not be used in totality, the unused bits may support upgrades of the system (for example a multi-jet head control).

The series communication procedure allows coding and regeneration of the stimulation signal:

- the transmission frequency of the bits over the serial line is a multiple of the stimulation frequency of the jet (or of the drop frequency),
- inversion of the communication direction over the line is synchronous with the rising/falling edges of the stimulation clock.

The transmission of the data is synchronous with the drop period:

- the data used for printing a drop are transmitted during the preceding drop period. The data flow is therefore synchronized on the generation of drops,
- the transmission of upstream data (console to head) is accomplished over a half period of the data exchange cycle and the transmission of the downstream data is accomplished over the other half period.

The sequence of bits of the digital data transmitted to the printing head 1*a* (the "upstream" data, transmitted during the period 310) is formed by the concatenation of digital values coded as binary words in a fixed format, known for each value. A CRC (Cyclic Redundancy Code) calculated over 8 bits, is added to this sequence of bits in order to allow verification of the integrity of the data.

In this upstream train of bits, the following data may be found in digital form:

- the code of the phase to be used for synchronizing the charging of the next drop, this code allowing a definition of the time shift between the rising edge of the stimulation signal and the instant of application of the charging voltage to the charging electrodes so that the voltage is applied to the charging electrode before or slightly before the breaking of the jet,
- and/or the value of the charging voltage to be applied to the charging electrode 7 in order to charge the next drop,
- and/or the duration during which this charging voltage is applied to these charging electrodes,
- and/or the amplitude of the stimulation signal, which will allow the inkjet to be broken at regular intervals.

These first pieces of information are sent for each jet to be driven, their number should therefore be multiplied by the number of jets to be driven.

In this same upstream train of bits the following data may also be found:

- the control of one or more solenoid valves 410 (described in more detail later on),
- and/or the VHV set value and/or the control of the VHV block of the head (means 411 of FIG. 6),
- and/or the control of the power supplies 406, 408,
- and/or the control, for example of a measurement multiplexer, providing selection and digitization of the output of the drop detection means 404*a* and/or the output of the recovery detection means 404*b* (in the recovery gutter 3), as this will be seen later on. Multiplexing may be extended to the signals of several jets,
- and/or a CRC for checking communication errors.

This above information may be modified at each "drop" period and will be applied to the members of the head during the next "drop" period.

The sequence of bits of the data transmitted to the control circuit 110*a* (the "downstream" data transmitted during the period 320) includes:

- at least one portion of the digital data which result from the digitization of the physical (analog) signals from the sensors 404*a*, 404*b* of the head, for example these signals are directed by a measurement multiplexer towards an analog/digital converter 405 of the head. With the succession of the digital data obtained at each drop period, the signal detected at the head 1*a* may be reconstructed in the controller 110*a*
- and/or the temperature of the head (which results from the measurement by the temperature measurement means 407),
- and/or information of logic type such as the detection of the presence of the lid or of power supply faults,
- and/or serial or version numbers,
- and/or a CRC for checking communication errors.

The inversion at instant 330 of the transfer direction of the data is achieved when a predetermined number $N_m$ of bits transporting at least the upstream data have been transmitted. Then, $N_d$ bits corresponding to the downstream data are transmitted, $N_d$ also being a predetermined number. This counting of bits is achieved by each of the electronic means of the head 1*a* and of the controller 110*a*, respectively.

The upstream data are received by the head 1*a*, and processed by a circuit, for example of the programmable logic circuit type, or a programmable logic array, for example of the "FPGA" type. This is the circuit 400 of the head 1*a*.

The downstream data are received in the controller 110*a*, by a circuit which formats them so that they may be used by the processing means of the controller, this circuit being for example of the programmable logic circuit type, or programmable logic array, for example of the "FPGA" type. This is the circuit 112 of FIG. 5.

The data are then elaborated or used in digital form by the controller 110*a* where no analog function is required for handling the operation of the head.

For a transmission through a serial link, the upstream data undergo a parallel/series conversion upon starting out from the controller 110*a*, while the downstream data undergo a series/parallel conversion upon being received by the controller 110*a*.

All the data processing operations by the controller 110*a* are preferably accomplished digitally which significantly simplifies the electronics of the latter relatively to the solutions of the prior art, since an analog function is no longer required in the controller 110*a* for handling operation of the head. Preferably, a controller of a device according to the invention does not include means for processing analog signals associated with the control of the head.

Figure 5:
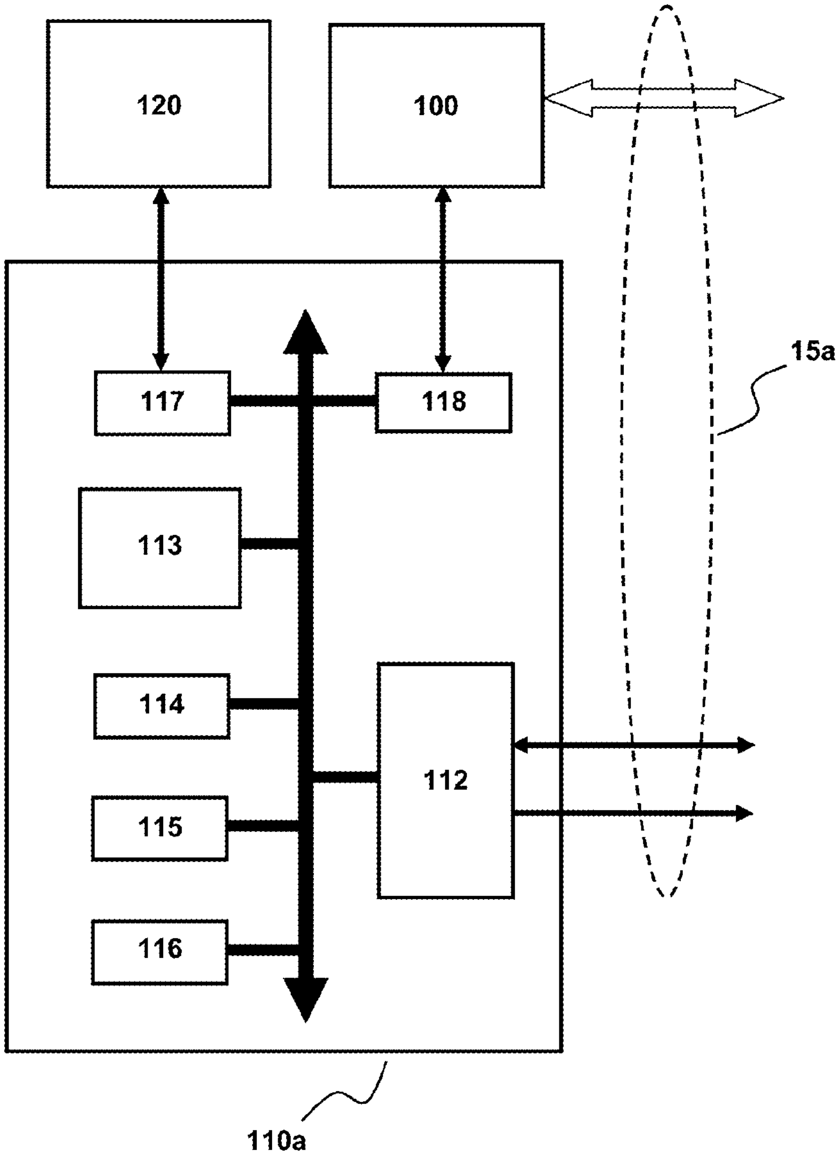
FIG. 5 is a diagram of a control circuit.

It includes, as illustrated in FIG. 5, the circuit 112, with which the digital data for driving the head 1*a* may be sent to the latter. It further receives downstream data and may process them, it uses these data for controlling the head and the ink circuit 100 (through the electronic interface 118) and may send them to the means 120 through the communications interface 117 in order to inform the user on the operating state of the printer. It includes storage means for storing in memory the instructions relating to the processing of the data, whether these are upstream data or downstream data.

It includes an on-board central processing unit, which itself comprises a microprocessor 113, a set of non-volatile memories 114 and RAM 115, a peripheral circuit 116, all these components being coupled to a bus.

The means 120 allow a user to interact with the printer disclosed here, for example by carrying out the configuration of the printer in order to adapt its operation to the constraints of the production line (throughput, printing rate, . . . ) and more generally of its environment, and/or the preparation of a production session for determining, in particular, the contents of the printing to be carried out on the products of the production line, and/or by showing real time information of production logging (state of the consumables, number of marked products, . . . )

In a preferred embodiment of the printer, the analog electronic means and the logic electronic means for driving the head 1*a* as well as one or more power supply means are implemented in the actual head 1*a*.

Figure 6:
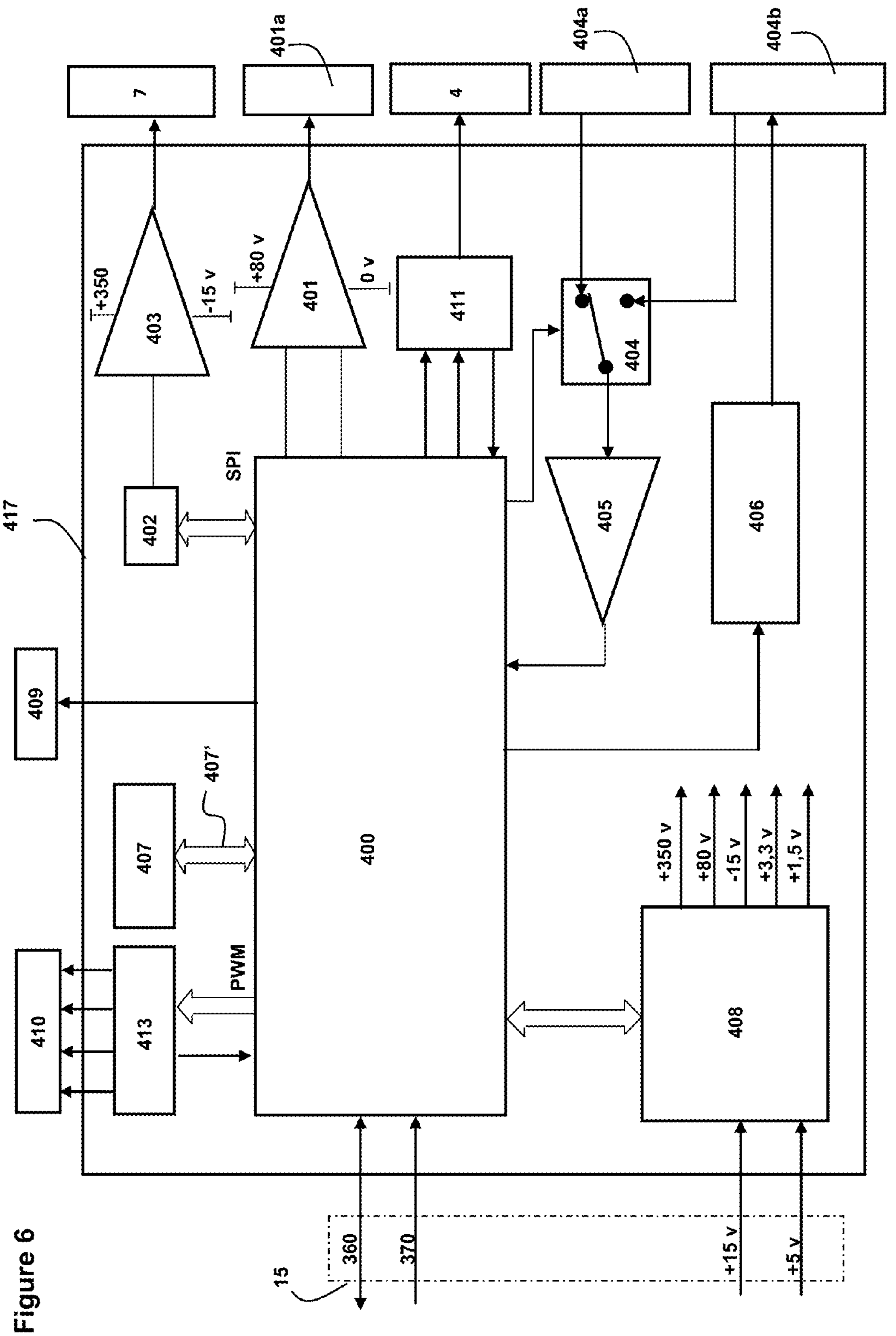
FIG. 6 is a diagram of the electronics implemented in the remotely deployed head of a device.

FIG. 6 schematizes the electronic means of a preferred embodiment of the head. These means notably include:

- power supply generator means 408, with which the voltages to be applied may be generated, for example here a voltage of +350 V, a voltage of +80 V, a voltage of −15 V, a voltage of +3.3 V, and a voltage of 1.5 V. These means 408 receive a low voltage, for example a signal of +15 V and a signal of +5 V. No high voltage is therefore transmitted from the controller 110*a* to the head 1*a*,
- an ADC converter 405, which receives via the multiplexer 404 the analog signals from the gutter sensor 404*b* and from the drop sensor 404*a*,
- high voltage power supply generator means 411 which allow generation of voltages of several thousand volts to be applied to the deflection plates 4,
- amplifier means 401, 403, which provide the signals to be applied to the piezoelectric means 401*a* and to the charging electrodes 7, respectively,
- a digital/analog converter 402, which provides an analog signal at the input of the amplifier 403, on the basis of signals from the circuit 400.

A temperature sensor 407 allows measurement of the temperature in the head. It is connected to the circuit 400 through a local serial line 407'.

The circuit 400 of the head, in addition to coding and decoding the data 360, 370 transmitted over the communications line with the controller, ensures the following functions.

First of all, in order to control the various components of the head, it elaborates different control signals from upstream digital data present on the line 360:

- the stimulation signal, the period of which is restored from the instants of inversion of the communication direction over the bidirectional serial line 360 and the amplitude of which is defined by a portion of the upstream digital data, this signal being elaborated with view to being applied to the stimulation amplifier 401, and/or the signal for controlling the charging electrodes, for example a series digital/analog converter 402 which generates the charging signal in synchronism with the phase-shifted stimulation signal, and/or the control signal for picking up data from one or more sensors such as the sensors 404*a*, 404*b*, for example via a multiplexer 404, which directs the signals from the phase and gutter sensors towards the input of a measurement amplifier 405, the output signal of which is sent to the circuit 400, and/or the energizing clock signal 406 of the resistive sensor 404*b* of the gutter, and/or the signal for controlling the VHV block 411: the programming of the output value and the VHV on/off command, and/or the control and servo-control signal of the power supply generator 408, and/or the signal for controlling a stroboscopic LED diode 409 for observing the breaking of the jet, and/or the signal(s) for controlling the solenoid valves 410, for example of the phase-shifted PWM type, possibly via means 413 for shaping the analog control signals.

On the other hand, different analog signals measured or sensed at the head 1*a* are digitized by the circuit 400, in particular:

the signals from the sensors such as the sensors 404*a*, 404*b*, for example as from the outputs of a sigma-delta converter integrated into the measurement amplifier 405, and/or the temperature signal from the sensor 407, and/or the lid contact and/or VHV default and/or solenoid valve control default logic signals.

The downstream digital data elaborated by the circuit 400 from representative data of these signals, some of which are analog signals, are transmitted through the umbilical 15*a*, and then received by the controller 110*a*, where they may be processed.

Practically, the electronic circuit which from the upstream data, generates the signals for driving the head and the electric power supplies, is completely integrated into the printing head and implemented on a single circuit board 417 with a size close to the size of the head. This circuit board may be connected to the umbilical 15*a*, for example by means of an 8-point connector and to the head 1*a* through spring contacts.

As explained above, the additional electric power supplies required for operating the electronics of the head (+1.5V, +3.3V, −15V, +80V, +350V) are generated on the circuit board 417, by the means 408, from two voltages of +15V and +5V brought by the umbilical 15*a*. It is also possible to use only one voltage, the +15V one for example, which provides a gain of one wire in the umbilical 15*a*, but the use of 2 power supply lines is preferred, in order to allow reduction of the heat dissipation in the head 1*a*.

By the proximity of the deflection plates 4, positioned close to the head, the VHV block 411 only requires much less power than the one required in the prior art, which allows this block to be miniaturized and dimensioned to a minimum. It may be integrated in the head, its connection to the circuit board 417 is for example achieved through pins or mini flexible flat cable. In the prior art, the capacitive load of the umbilical led to over-dimensioning of the high voltage power supply housed in the controller 110.

The charging and stimulation amplifiers 401, 403 are integrated onto the electronic card 417 and use voltages generated by the means 408, for example a power supply of +80V and +350V respectively. The measurement amplifier 405, which may be unique, is used for the signals from the phase and gutter sensors which are multiplexed at its input; it occupies a reduced space.

By the proximity of the circuit board with the charging electrodes 7, but also with the piezoelectric actuator 401*a*, and with the drop detector and gutter sensors 404*a*, 404*b*, high level performances may be obtained while miniaturizing the various electronic functions.

The solenoid valves 410 may be controlled from chopped signals of the PWM type (with a variable duty cycle), phase-shifted in time, so that there are not many solenoid valves powered at the same time. With this, the current consumption may further be smoothed out. With the PWM signals, it is possible to control the solenoid valves with 2 different average voltages: a high switching voltage and a low holding voltage, the goal being to minimize the current consumption in the head.

The temperature sensor 407 and the charging digital/analog (D/A) converter 402 may be driven in series (SPI).

With the electronics 417, placed in the head 1*a*, the electronic components may be dimensioned to what is just required for driving the functions of the head.

It allows a reduction in the size, in the consumed power and in the cost of the electronics for driving the head.

The umbilical cable 15*a*, has a length which may depend on the printer used. It includes two end pieces ensuring the mechanical interface between the console 110*a* and the cable 15*a* on the one hand and the printing head 1*a* and the cable 15*a* on the other hand, and possibly of components for connecting the electric conductors and the hydraulic conduits of the umbilical with the controller 110*a*, the ink circuit or the head 1*a* of the printer.

Figure 7A:
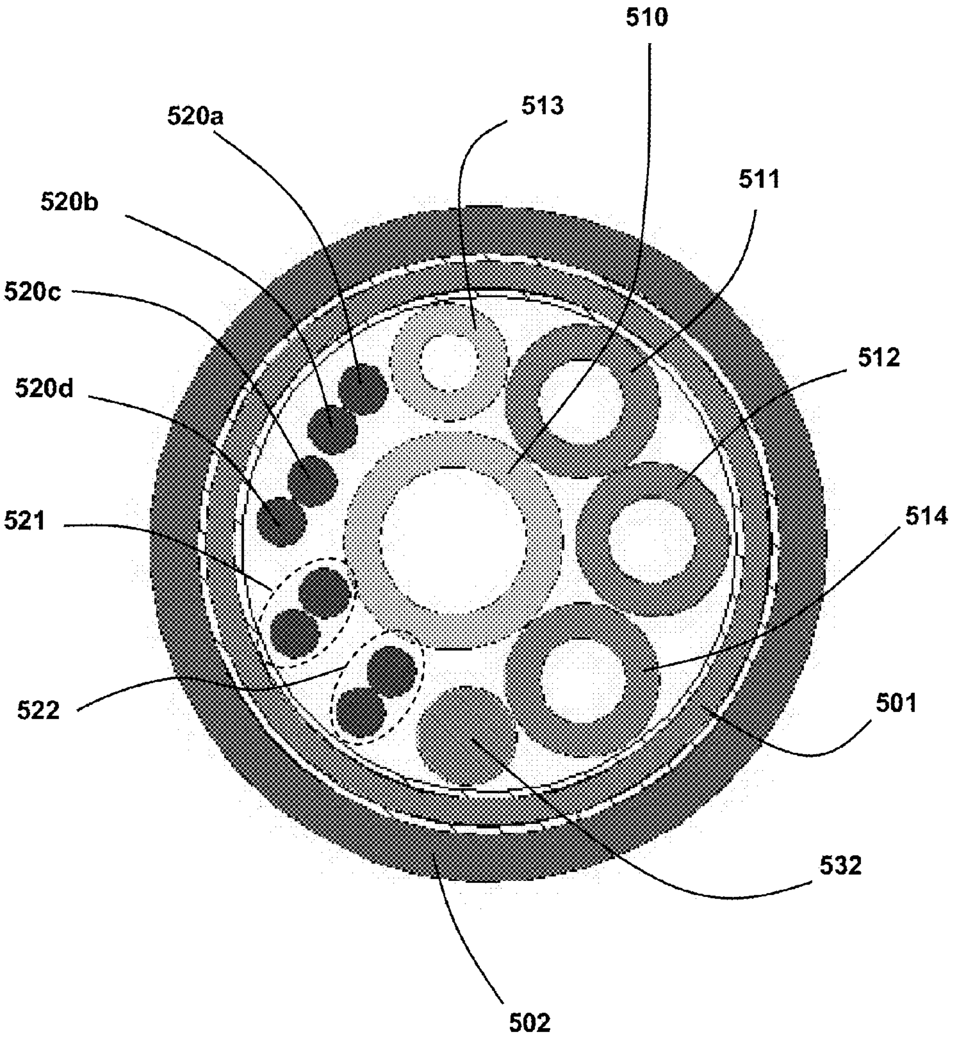
FIG. 7A is a sectional view of the umbilical.

FIG. 7A shows a section of the cable in a preferred embodiment. The cable then includes:

5 hydraulic conduits 510-514 (pipes) dedicated to the ink supply 511, to the solvent supply 513, to the purge of the drop generator 512, to the recovery of the ink arriving at the gutter 510 and to the air pressurization of the head 514, respectively, 4 wires of small diameter 520*a*, 520*b*, 520*c*, 520*d*, intended for the low voltage power supply of the head (0V, +5V, +15V+one reserve wire unused). It has already been noted that 2 wires may be functionally sufficient (0V, +15V), 2 twisted pairs: 521, 522 of small diameter which allow transmission of the data 360 and of the clock signals 370 in differential form and which support synchronous bidirectional serial communications, a wire with a large diameter 532 ensuring the continuity of the ground in order to guarantee good equipotentiality between the console and the head.

According to one example a device has 2 electrical wires for the low voltage power supply, one twisted pair forming a bidirectional digital serial link in order to transmit digital data and one wire for the ground, hence 5 wires.

This number of wires can be reduced to 3 electrical wires if the means forming a bidirectional digital serial link comprise an optical fiber but no electrical wire.

According to another example a device has 3 electrical wires for the low voltage power supply, 4 wires for bidirectional data transmission, one wire 532 with a larger diameter, hence 8 wires.

An EMC shielding 501 may be provided, for example as a braided copper sheath 501 clasping the whole of the conduits and wires of the umbilical.

An outer cladding 502 may be overmoulded over the shielding sheath 501, the material of which is selected for its compromise between its mechanical and chemical strength as well as its flexibility.

Endpieces may be overmoulded, on either side of the umbilical. These are preferably identical to the 2 ends in order to minimize manufacturing cost.

The electric connection towards the controller 110 and towards the head 1 may be ensured for example by a simple low cost 8-point connector, handling the 8 wires of small diameter of the cable.

The hydraulic connection is for example ensured on the side of the head 1*a* by a hydraulic interface which groups the ends of the conduits of the cable on a single component of the bored block type which may be set into place on the head with a single screw.

The hydraulic connection of the umbilical in the console 20*a* is for example accomplished by direct fittings of the pipes onto the functions of the ink circuit 100.

Figure 7B:
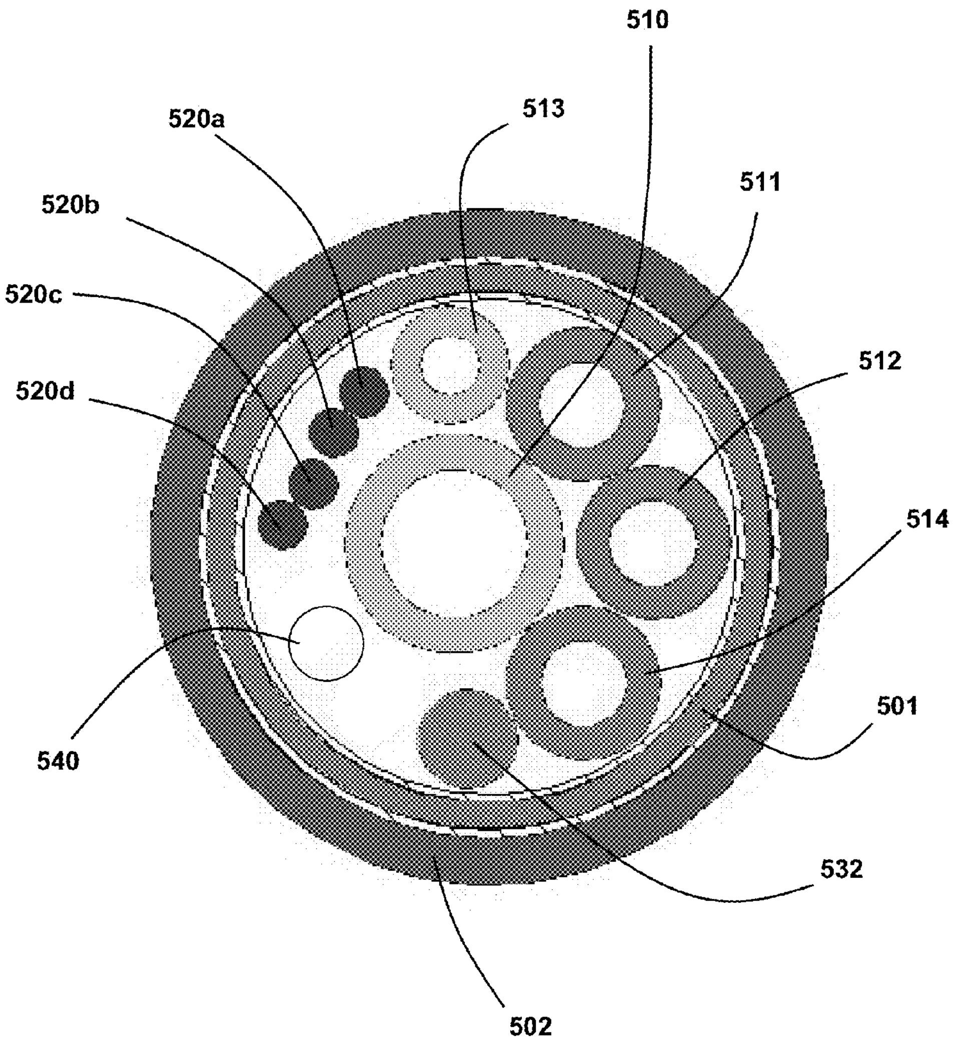
FIG. 7B is a sectional view of an alternative umbilical.

FIG. 7B illustrates an alternative, itself also in a sectional view, of the cable presented above. The communication is then ensured by an optical fiber 540, which conveys all the data, both the upstream digital data and the downstream digital data. The cable further includes four wires 520*a*-520*d* for the power supply. The remainder of the structure is identical with the one which has been presented above in connection with FIG. 7A.

As this is understood from the description above, the electronic connections of the umbilical (except for the general shielding and ground continuity braid) may be achieved over only 4 electric wires, if the power supply wires are used for transmitting the signals by a carrier current (i.e. 2 twisted pairs: one for one of the power supplies and the differential clock signal (clock +/−) and the other one for the second power supply (possibly) and the differential signal of the data (data +/−) on the other hand.

The thereby made umbilical is finer and more flexible than the connecting cables usually used for continuous inkjet printers. It only includes a few wires of current technology (7 wires of small diameter and the ground wire) regardless of the number of jets instead of more than about twenty in the prior art for driving 1 jet and 3 extra wires per additional jet. The technical wires with large diameter and/or shielded wires are therefore suppressed.

The thereby made umbilical is of a small diameter (~12 mm, more generally less than or equal to 15 mm) and with a weight which is significantly less than those of the state of the art. Thus, the cable is more than 40% lighter than an equivalent cable of the prior art (Markem-Imaje 9020 for example).

Further, its radius of curvature is significantly reduced relatively to the prior art (a reduction of more than 30% relatively to an equivalent cable of the prior art).

The integration of a printing head on a manufacturing line is facilitated because the required space for placing the head 1*a* and the umbilical 15*a* is reduced.

The cost of the thereby made umbilical is substantially reduced relatively to the existing type, (−45% relatively to the umbilical of a known printer Markem-Imaje 9020).

There is actually a reduction in the cost of material for the ground braid of the shielding sheath 501 and for the outer cladding 502.

Another source of cost reduction comes from the reduction in the number of wires and from the suppression of the coaxial technical wires with strong insulation or with a large diameter.

The length of the umbilical may also have any value without any incidence on the dimensioning of the electronics.

The nature of the electric connections is not involved, unlike the prior art where the capacitive load due to the wires determines the electronics in the controller 110 and the length of the umbilical 15.

The drivers of the serial line enable transmissions over lengths which are much greater than the practical length of the umbilicals.

The effect of the resistance of the power supply wires, even of small diameter, on the length of the umbilical, remains negligible since the consumption of the head is low.

In such a device, the composition of the umbilical does not depend on the number of jets to be driven in the head.

The case of a plurality of jets only has the incidence of adding more transferred data 360. At the electronic card 417 located in the head, the presence of several jets in the head leads to duplication of the converter 402 and of the charging amplifier 403. Also, the stimulation amplifier 401 is duplicated if the stimulation is not common to all the jets. Finally, the multiplexer 404 of measurement signals selects a signal from the drop detection and gutter signals of each of the jets.

An electronic control device, for a head including several jets, then includes, in addition to the means 400, at least two converters 402 and at least two charging amplifiers 403. Optionally, it may include at least two stimulation amplifiers 401. The other means described above in connection with FIG. 4 may also be present.

Further, certain portions of the FPGA circuit 400 may also be duplicated in the circuit in order to drive additional functions. Adaptation of the electronic diagram for driving 2 jets leads to developments of the circuit which are quite reasonable in terms of size of the electronic card or of the integration constraint.

The manufacturing and the assembling of the head/umbilical assembly of a device is simplified.

In particular, the head/umbilical connection is achieved by assembling (without any welding), for example by using a simple 8-point electric connector and spring contacts as well as a hydraulic connector set into place with 2 screws.

Further, troubleshooting and maintenance may be accomplished in a simple and rapid way by intervening persons without any specific skill.

The invention claimed is:

1. A supply cable for a printing head of a continuous inkjet printer, the supply cable comprising:

at least one hydraulic conduit for supplying at least one fluid via said supply cable;

a bidirectional digital serial link configured to transmit digital data via said supply cable; and at least one low voltage power supply line contained within said supply cable, wherein said bidirectional digital serial link and said at least one low voltage power supply line are contained within a shielding disposed within an interior of said supply cable, and wherein electrical characteristics of said digital data and power supplied by said at least one low voltage power supply line are independent of said at least one hydraulic conduit, said at least one fluid, and said shielding.

2. The supply cable according to claim 1, wherein said bidirectional digital serial link comprises a wire serial line, an optical fiber, or means for circulating a carrier current on the at least one low voltage power supply line or on conducting means connecting a console to the printing head.

3. The supply cable according to claim 1, further comprising a wire which ensures equipotentiality between the printing head and a controller for driving said printer.

4. The supply cable according to claim 1, wherein an outer diameter of the supply cable is less than 14 mm.

5. The supply cable according to claim 1, wherein the cable comprises between 3 and 12 electric wires.

6. The supply cable according to claim 1, wherein the cable comprises between 2 and 5 hydraulic conduits.

7. A printing head, for a printer with one continuous jet or with several continuous jets of ink drops, the printing head comprising: a drop generator; charging electrodes; a drop deflector; and a supply cable comprising at least one hydraulic conduit for supplying at least one fluid via said supply cable;

a bidirectional digital serial link configured to transmit digital data via said supply cable; and at least one low voltage power supply line contained within said supply cable, wherein said bidirectional digital serial link and said at least one low voltage power supply line are contained within a shielding disposed within an interior of said supply cable, and wherein electrical characteristics of said digital data and power supplied by said at least one low voltage power supply line are independent of said at least one hydraulic conduit, said at least one fluid, and said shielding.

8. An electronic device for controlling a printing head of a printer with one continuous jet or with several continuous jets of ink drops, the device comprising:

an electronic control circuit configured to receive digital data from a controller, and to send digital data to said controller;

convert a portion of the received digital data into signals for controlling a drop generator, and for charging electrodes and a drop deflector;

control a generator generating at least one high voltage from low voltage signals from said controller; and control said generator to generate, from said low voltage signals from said controller, at least one high voltage suitable for application to deflection plates of said printing head of said continuous jet printer.

9. The device according to claim 8, wherein said electronic control circuit is further configured to receive data from at least one sensor detecting a charge of the drops and/or one sensor of a gutter for recovering the drops.

10. The device according to claim 9, wherein said electronic control circuit is further configured to receive data from at least one temperature sensor for the ink in the printing head.

11. The device according to claim 8, wherein said electronic control circuit receives digital data received from said controller, and sends digital data to said controller, at a data exchange frequency.

12. The device according to claim 11, wherein the data exchange frequency is a multiple of a drop formation frequency.

13. The device according to claim 8, wherein the digital data received from said controller includes at least one of:

a phase code for synchronizing charging of a next drop;

a value or a duration of a charging voltage to be applied to the charging electrodes;

an amplitude of a stimulation signal which breaks the ink-jet at regular intervals;

control data of one or more solenoid valves;

a signal for controlling a high voltage block of the head;

control data of at least one power supply generator;

a control signal for digitization of at least one measurement sensor of the head; and a signal for checking communication errors.

14. The device according to claim 8, wherein the digital data sent to said controller includes at least one of:

a digital data which results from digitization of physical or analog signals from at least one sensor of the head;

a measurement signal of the temperature of the head;

a detection signal identifying a presence of a lid or of power supply faults;

a serial or version number of the head; and a Cyclic Redundancy Code (CRC) for checking communication errors.

15. A printing head, for a printer with one continuous jet or with several continuous jets of ink drops, the printing head comprising:

a drop generator;

charging electrodes;

a drop deflector; and an electronic device comprising an electronic control circuit configured to receive digital data from a controller, and to send digital data to said controller;

convert a portion of the received digital data into signals for controlling a drop generator, and for charging electrodes and a drop deflector; and control a generator generating at least one high voltage from low voltage signals from said controller; and control said generator to generate, from said low voltage signals from said controller, at least one high voltage suitable for application to deflection plates of said printing head of said continuous jet printer.

16. A method for controlling a printing head of a printer with a continuous jet or several continuous jets of drops of ink, with a controller, the method comprising:

sending by said controller and receiving by the printing head, of at least digital data for controlling a drop generator, charging electrodes and a drop deflector, and of low voltage signals for controlling at least one high voltage generator from said low voltage signals to cause said at least one high voltage generator to generate at least one high voltage suitable for application to deflection plates of said printing head of said continuous jet printer; and sending, by the printing head, and receiving by said controller of at least digital data from at least one sensor sensing a charge of the drops and a sensor of a gutter for recovering the drops.

17. The method according to claim 16, wherein the sending and the receiving of data is performed using a bidirectional digital serial link.

18. The method according to claim 16, wherein the digital data received from said controller includes at least one of:

a phase code for synchronizing the charging of a next drop;

a value or a duration of a charging voltage to be applied to charging electrodes;

an amplitude of a stimulation signal which breaks the ink-jet at regular intervals;

a control signal of one or more solenoid valves;

a control signal of a high voltage block of the head;

a control signal of at least one voltage supply;

a signal for controlling digitization of at least one measurement sensor of the head; and a signal for checking communication errors.

19. The method according to claim 16, wherein the digital data sent to said controller includes at least one of:

digital data which results from digitization of physical or analog signals from at least one sensor of the head;

a temperature measurement signal of the head;

a signal identifying a presence of a lid and/or of power supply faults;

a serial or version number of the head; and a CRC for checking communication errors.

20. A continuous inkjet printer, comprising:

a controller;

a printing head, including a drop generator, charging electrodes and a drop deflector; and an electronic control device comprising an electronic control circuit configured to receive digital data from a controller, and to send digital data to said controller;

convert a portion of the received digital data into signals for controlling a drop generator, and for charging electrodes and a drop deflector; and control a generator generating at least one high voltage from low voltage signals from said controller; and a supply cable of the printing head, wherein the supply cable comprises at least one hydraulic conduit for supplying at least one fluid via said supply cable;

a bidirectional digital serial link configured to transmit digital data via said supply cable; and at least one low voltage power supply line contained within said supply cable, wherein said bidirectional digital serial link and said at least one low voltage power supply line are contained within a shielding disposed within an interior of said supply cable, and wherein electrical characteristics of said digital data and power supplied by said at least one low voltage power supply line are independent of said at least one hydraulic conduit, said at least one fluid, and said shielding.

21. The printer according to claim 20, further comprising an ink circuit.

22. The printer according to claim 20, wherein said drop generator, the charging electrodes, and a drop deflector are configured to form one inkjet.

23. The printer according to claim 20, wherein said drop generator, the charging electrodes, and a drop deflector are configured to form a plurality of inkjets.

* * * * *